US012798445B2

(12) United States Patent
Wittmann

(10) Patent No.: US 12,798,445 B2
(45) Date of Patent: Nov. 17, 2026

(54) VEHICLE SEAT

(71) Applicant: GRAMMER Aktiengesellschaft, Ursensollen (DE)

(72) Inventor: Hubert Wittmann, Floß (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 127 days.

(21) Appl. No.: 18/784,093

(22) Filed: Jul. 25, 2024

(65) Prior Publication Data

US 2025/0050788 A1 Feb. 13, 2025

(30) Foreign Application Priority Data

Aug. 8, 2023 (DE) ..................... 10 2023 121 073.4

(51) Int. Cl.
*B60N 2/00* (2006.01)
*B60N 2/20* (2006.01)

(52) U.S. Cl.
CPC ............. *B60N 2/0034* (2023.08); *B60N 2/20* (2013.01)

(58) Field of Classification Search
CPC .. B60N 2/0034; B60N 2/0035; B60N 2/0027; B60N 2/0031
See application file for complete search history.

(56) References Cited

U.S. PATENT DOCUMENTS 8,013,264 B2 * 9/2011 Kawahira ............ B60N 2/0021 200/85 A
8,082,026 B2 * 12/2011 Imamura .............. A61B 5/0255 340/576
8,335,617 B2 * 12/2012 Satake ................. B60N 2/0033 204/429
8,937,478 B2 * 1/2015 Shimizu ............ B60R 21/01532 324/692
11,642,983 B2 * 5/2023 Ozawa ................. B60N 2/5621 297/180.12
12,427,894 B1 * 9/2025 Motto .................... B60N 2/002
2004/0032117 A1 2/2004 Pinto, IV et al.
2010/0170722 A1 7/2010 Maeda

FOREIGN PATENT DOCUMENTS

DE 4023350 1/1992
DE 19625730 1/1998
DE 19648268 5/1998
DE 10144878 9/2002
(Continued)

OTHER PUBLICATIONS

Extended European Search Report for Europe Patent Application No. 24188806.4, dated Dec. 23, 2024, 18 pages.
(Continued)

*Primary Examiner* — Timothy J Brindley
(74) *Attorney, Agent, or Firm* — Sheridan Ross P.C.

(57) ABSTRACT

The invention relates to a vehicle seat, in particular for commercial vehicles, comprising a seat part and a backrest, wherein the vehicle seat has an apparatus for detecting seat occupancy, which comprises at least one first detection device and at least one second detection device, wherein the at least one first detection device is suitable and intended for detecting occupancy of the seat part, wherein the at least one second detection device is suitable and intended for detecting occupancy of the backrest.

8 Claims, 3 Drawing Sheets

(56) References Cited

FOREIGN PATENT DOCUMENTS

| | | | | | |
|---|---|---|---|---|---|
| DE | 10137567 | | | 2/2003 | |
| DE | 10237170 | | | 10/2003 | |
| DE | 10320287 | | | 12/2004 | |
| DE | 10335734 | | | 2/2005 | |
| DE | 102004041879 | | | 3/2006 | |
| DE | 102015014791 | | | 5/2016 | |
| DE | 102017009004 | | | 3/2019 | |
| DE | 102018207975 | | | 11/2019 | |
| DE | 112017004754 | | | 5/2024 | |
| EP | 1470949 | A1 | * | 10/2004 | ........... B60N 2/0252 |
| JP | 11271463 | A | * | 10/1999 | |

OTHER PUBLICATIONS

Official Action for Germany Patent Application No. 102023121073.4, dated Mar. 27, 2024, 8 pages.

* cited by examiner

VEHICLE SEAT

CROSS REFERENCE TO RELATED APPLICATION

This application claims the benefit of German Patent Application No. 10 2023 121 073.4, filed Aug. 8, 2023, the entire contents of which are hereby incorporated herein by reference.

FIELD

The invention relates to a vehicle seat, in particular for commercial vehicles, comprising a seat part and a backrest.

BACKGROUND

Such commercial vehicles include tractors, mowers, fork-lift trucks and construction machinery. These commercial vehicles are often set up so that a function is or remains activated only when an occupant is in the vehicle seat. This is necessary for safety reasons.

Devices for detecting seat occupancy are already known from the state of the art. These are provided in the seat part of the vehicle seat. Such an apparatus for detecting seat occupancy recognises a seat occupancy when a predetermined weight force acts on it. During operation of the commercial vehicle, the occupant, or driver, often has to turn backwards, for example when reversing, coupling machinery to the rear of the commercial vehicle or to view functional equipment, such as a mower at the rear of the commercial vehicle. During the turning movement, the occupant shifts weight to the legs or otherwise supports themselves with their arms. This reduces the weight force acting on the seat part or the apparatus for detecting seat occupancy. This can lead to the apparatus for detecting seat occupancy recognising the seat as unoccupied and outputting a corresponding signal. Modern commercial vehicles stop immediately when a corresponding "not occupied" signal is issued. This "false" detection of a non-occupied seat has a detrimental effect on the occupant's workflow.

The task of the present invention is to overcome this disadvantage.

SUMMARY

Embodiments of the present disclosure provide a vehicle seat, in particular for commercial vehicles, comprising a seat part and a backrest, wherein the vehicle seat has an apparatus for detecting seat occupancy, which comprises at least one first detection device and at least one second detection device, wherein the at least one first detection device is suitable and intended for detecting occupancy of the seat part, wherein the at least one second detection device is suitable and intended for detecting occupancy of the backrest.

The apparatus for detecting seat occupancy according to the present disclosure thus detects both occupancy of the seat part and occupancy of the backrest. The risk of incorrect detection due to a reduction in the weight force acting on the seat part is thus reduced.

According to a preferred embodiment, the apparatus for detecting seat occupancy outputs a seat occupancy state. The seat occupancy state can be output as "occupied" or "not occupied". Preferably, the seat occupancy state is only output as not occupied if the at least one first detection device and the at least one second detection device do not detect any occupancy. Preferably, the apparatus for detecting seat occupancy links the output of the at least one first detection device and the at least one second detection device. When the driver rotates in the vehicle seat, the weight force acting on the at least one first detection device can be reduced so that it does not detect any occupancy. However, occupancy of the backrest is still recognised by the at least one second detection device. The seat occupancy state output is therefore still occupied. By providing at least one second detection device for detecting occupancy of the backrest and by linking the output signals of the two detection devices accordingly, incorrect output of a non-occupancy of the seat when the occupant turns is thus avoided.

According to a preferred embodiment, the at least one first detection device emits a first signal when an occupancy occurs. Preferably, the at least one second detection device outputs a second signal in the event of occupancy. Preferably, the at least one first detection device outputs a second signal in the event of non-occupancy. Preferably, the at least one second detection device outputs a second signal in the event of non-occupancy. Preferably, the second signal is a specified signal. However, it is also conceivable that the second signal is merely the absence of the first signal.

Advantageously, the at least one first detection device and the at least one second detection device are connected in parallel in terms of signalling technology. Preferably, the at least one first detection device and the at least one second detection device are linked by means of a logical OR operation. Both the parallel connection and the OR operation provide the same output. If both the at least one first detection device and the at least one second detection device output an occupancy, the vehicle seat is considered occupied. If the at least one first detection device or the at least one second detection device outputs a non-occupancy, but at the same time the other detection device outputs an occupancy, the vehicle seat is also considered occupied. Only if both the at least one first detection device and the at least one second detection device indicate non-occupancy is the vehicle seat considered unoccupied. The following table shows the aforementioned advantageous outputs:

| Output of the at least one first detection device | Output of the at least one second detection device | Output of the apparatus for detecting seat occupancy |
|---|---|---|
| occupied | occupied | occupied |
| occupied | unoccupied | occupied |
| unoccupied | occupied | occupied |
| unoccupied | unoccupied | unoccupied |

According to a particularly preferred embodiment, the seat part comprises a frame element and/or a plate-like element, on or at which at least one seat cushion is arranged. The frame element and/or the plate-like element can be of any desired design. The backrest preferably also comprises a frame element on or at which at least one cushion element is arranged. Preferably, the height of the backrest is such that support is only provided in the lumbar region and/or in the lower shoulder region. The backrest therefore preferably does not extend to the upper shoulder area of the person in the seat and does not include a headrest. Such "half-height" backrests are often provided in commercial vehicles in which the occupant or driver often has to look backwards. These are, for example, tractors, construction machinery or similar.

According to a further preferred embodiment, the at least one first detection device is arranged in or on the seat part. Preferably, the at least one second detection device is arranged in or on the backrest. The two detection devices can advantageously have different individual detection elements.

According to a further preferred embodiment, the at least one first detection device comprises at least one first sensor which is suitable and intended to detect an occupancy of the seat part. Preferably, the first sensor is selected from the group: a mechanical sensor, a pressure sensor, a capacitive sensor, an inductive sensor, an optical sensor, an air-flow sensor, a temperature sensor, an ultrasonic distance sensor an electromagnetic sensor, for example lidar or radar. Of course, other suitable sensors are also conceivable.

Preferably, the at least one first sensor is arranged on a first mat element. Advantageously, the vehicle seat comprises at least one first mat element with at least one first sensor. Preferably, the at least one first mat element is equipped with several first sensors. Preferably, the first sensors are arranged at predetermined intervals over the entire surface of the first mat element. Advantageously, the at least one first mat element can be arranged on, in or under the cushion element of the seat part.

According to a further preferred embodiment, the at least one second detection device comprises at least one second sensor which is suitable and intended to detect occupancy of the backrest, wherein the second sensor is selected from the group: a mechanical sensor, a pressure sensor, a capacitive sensor, an inductive sensor, an optical sensor, an air-flow sensor, a temperature sensor, an ultrasonic distance sensor, an electromagnetic sensor, for example lidar or radar. Of course, other suitable sensors are also conceivable.

Preferably, the at least one second sensor is arranged on a second mat element. Advantageously, the vehicle seat comprises at least one second mat element with at least one second sensor. Preferably, the at least one second mat element is equipped with several second sensors. Preferably, the second sensors are arranged at predetermined intervals over the entire surface of the second mat element. Advantageously, the at least one second mat element can be arranged on, in or under the cushion element of the backrest.

The at least one first sensor and the at least one second sensor are each a detection element of the respective detection device.

According to a further preferred embodiment, the at least one first detection device and/or the at least one second detection device comprises at least one first switching element. Preferably, the first switching element is a mechanical switching element. Preferably, the occupancy (of the backrest or of the seat part) causes a weight force to act on the at least one first switching element, as a result of which the at least one first switching element can be brought from a first switching state into a second switching state. Preferably, the mechanical, at least one first switching element is displaced from a first switching state to a second switching state during an occupancy. Preferably, a weight force is exerted on the mechanical at least one first switching element during an occupancy. The occupancy is preferably a direct or indirect contact of the at least one first switching element with the body of the occupant. Such a first switching element is a simply designed and inexpensive to manufacture component by means of which occupancy detection can be achieved. The at least one first switching element is a detection element of the respective detection device.

According to a further preferred embodiment, the at least one first detection device and/or the at least one second detection device comprises a pivotably arranged rod-like element. Advantageously, the rod-like element has a bracket-like design. Preferably, the rod-like element is arranged under or in a cushion element of the backrest or the seat part. Preferably, the backrest or the seat part comprises at least one bearing element, preferably two bearing elements, which support the rod-like element. The at least one bearing element can be arranged on the backrest frame, the seat part frame or the plate-like element of the seat part.

Preferably, a prestressing element is provided which holds the rod-like element in a first position. The prestressing element can preferably be a spring element, for example a tension or compression spring or an elastic element.

Preferably, a second switching element is provided, which is in active contact with the rod-like element. A force is preferably exerted on the rod-like element by an occupancy (of the backrest or the seat part), causing the rod-like element to move to a second position due to the active contact. Advantageously, this displacement also displaces the second switching element, causing it to make contact with a contact element. The occupancy advantageously exerts a force on the rod-like element so that it is displaced against the force of the prestressing element.

According to a further preferred embodiment, the backrest is arranged on the seat part by means of two fittings. Preferably, the backrest can be pivoted relative to the seat part. Advantageously, at least one of the fittings comprises an elastic element, the elastic force of which counteracts the pivoting. This enables the backrest to be sprung to a certain extent. It is also conceivable that the inclination of the backrest can be adjusted or locked by an adjustment device in at least one of the fittings.

Preferably, the at least one second detection device, which detects occupancy of the backrest, is arranged in or on at least one of the two fittings. Preferably, occupancy of the backrest can thus be detected due to an entanglement of the backrest relative to the seat part. This can be achieved, for example, by a switching element that is coupled to the elastic element. When the backrest is occupied, it is tilted at least a small distance relative to the seat part. When the backrest is tilted in this way, the switching element transitions to the switching state that characterises the occupancy of the backrest. Alternatively or cumulatively, the at least one second detection device could comprise a measuring device that detects a torque in at least one of the two fittings. In this case, the torque is generated by the interlocking of the backrest relative to the seat part. After the torque exceeds a predetermined threshold value, the backrest is recognised as occupied.

Further advantages, objectives and features of the present invention are explained with reference to the following description of the attached figures. Similar components may have the same reference signs in the various embodiments.

DETAILED DESCRIPTION

Figure 1:
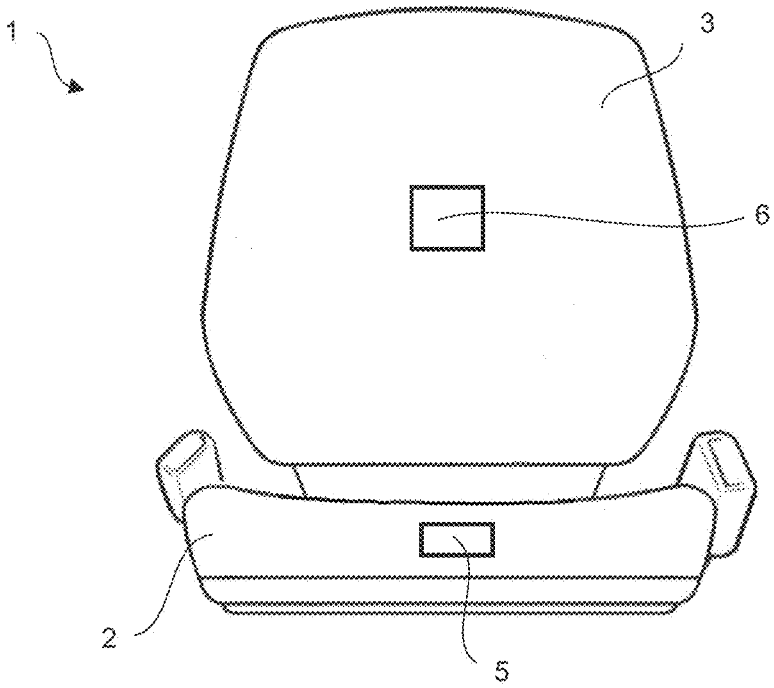
FIG. 1 a vehicle seat according to one embodiment.

FIG. 1 shows a vehicle seat, in particular for commercial vehicles, comprising a seat part 2 and a backrest 3. The vehicle seat 1 has an apparatus for detecting seat occupancy 4. This device comprises at least one first detection device 5 and at least one second detection device 6, wherein the at least one first detection device 5 is suitable for detecting an occupancy of the seat part 2, wherein the at least one second detection device 6 is suitable and intended for detecting an occupancy of the backrest 3.

Figure 2:
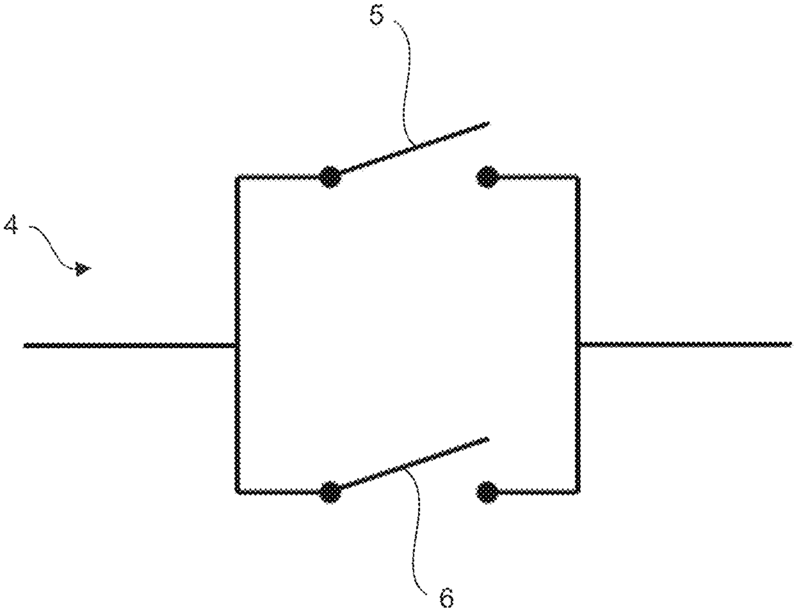
FIG. 2 a schematic diagram of the apparatus for detecting seat occupancy according to one embodiment.

FIG. 2 shows a schematic diagram of the apparatus for detecting seat occupancy 4. The two detection devices 5, 6 are shown in principle as switching elements connected in parallel. The two detection devices 5, 6 can, as shown, be connected in parallel in terms of signalling. This would be applicable if the detection devices 5, 6 comprise corresponding switching devices. However, a logical connective in the form of a disjunction (OR) would also be conceivable. This would be preferable if the detection devices comprise detection elements in the form of sensors. However, the parallel connection and the disjunction (OR) would lead to the same behaviour.

The apparatus for detecting seat occupancy 4 outputs a seat occupancy state or a signal corresponding to a seat occupancy state. The seat occupancy state can be output as occupied and unoccupied. There are therefore only two states that are output by the apparatus for detecting seat occupancy 4. Such an output is analysed accordingly by a control device of the commercial vehicle. For example, if the vehicle seat is not occupied, the commercial vehicle can be stopped. In the present case, the apparatus for detecting seat occupancy 4 only outputs a seat occupancy state as unoccupied if unoccupancy is detected by the at least one first detection device 5 and by the at least one second detection device 6.

The at least one first detection device and the at least one second detection device can output the occupancy in different ways. In the event of occupancy, the at least one first detection device 5 outputs a first signal. In the event of non-occupancy, a correspondingly defined signal can be output or the absence of the first signal can be analysed as a non-occupancy signal. The at least one second detection device outputs a second signal in the event of occupancy. In the case of the at least one second detection device, a correspondingly defined signal can also be output in the event of non-occupancy, or the absence of the second signal can be evaluated accordingly as a non-occupancy signal.

By evaluating an occupancy of both the seat part and the backrest, it is possible to prevent an erroneous output of the seat occupancy due to a reduced weight force acting on the first detection device 5 in the seat part 2 from leading to an output of a non-occupancy.

The at least one first detection device 5 can be arranged in or on the seat part 2. Similarly, the at least one second detection device 6 can be arranged in or on the backrest 3. The detection devices 5, 6 can be designed differently. The detection devices 5, 6 can comprise detection elements in the form of mechanical switching elements, electrical switching elements or also in the form of various sensors which can detect occupancy of the seat part 2 or the backrest 3. In this case, occupancy is the occupant's body coming into contact with the seat part 2 or the backrest 3, but occupancy can also be the application of force by the occupant's body to the seat part 3 or the backrest 3.

FIGS. 3-6 show various embodiments of how a second detection device 6 can be designed. In these embodiments of FIGS. 3-6, the design of the first detection device 5 is not explicitly specified. The first detection device 5 can of course be designed analogue to the second detection device 6. Several first detection devices 5 and/or several second detection devices 6 can also be provided. Any combination of the at least one first detection device 5 and the at least one second detection device 6 is conceivable, and it would also be conceivable to provide detection devices that are designed differently from those shown in FIGS. 3-6.

Figure 3:
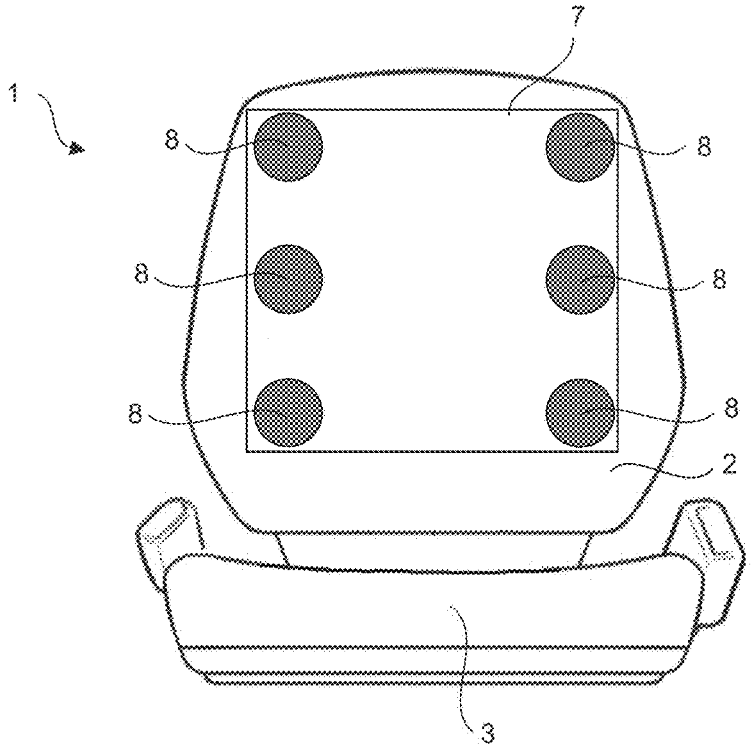
FIG. 3 a vehicle seat with an apparatus for detecting seat occupancy according to one embodiment.

FIG. 3 shows a second detection device 6, which comprises a second mat element 7. The second mat element 7 has at least one second sensor 8. In the present case, 6 second sensors 8 are provided, which are distributed at predetermined distances on the second mat element 7. The second sensors 8 are suitable and intended for detecting occupancy of the backrest 3. Various types of sensors can be used for this purpose.

For example, a pressure sensor that detects pressure caused by the weight of the occupant's body.

It would also be conceivable to use a capacitive sensor. A capacitive sensor is a sensor that works on the basis of the change in the electrical capacitance of an individual capacitor or a capacitor system. The capacitance can be influenced by the variable to be detected in various ways. For example, one electrode can be moved relative to another by a pressure movement. However, a capacitive sensor can also be designed as a type of proximity switch whose function is based on the change in the electric field in the environment in front of its sensor electrode.

It would also be conceivable to use an optical sensor. An optical sensor can, for example, comprise a light source that emits visible or infrared light and a detector. A change in the reflection or the amount of light from the occupant's body is detected.

Other conceivable types of sensors are: a mechanical sensor, an inductive sensor, an air-flow sensor, a temperature sensor, an ultrasonic distance sensor or an electromagnetic sensor, for example LIDAR or RADAR. The sensors output a corresponding signal, which is then combined with a signal from the first detection device. The resulting signal is then passed on to a control device of the vehicle.

The at least one first detection device can of course also be equipped in an analogue manner with a first mat element, which comprises at least one first sensor that is suitable and intended for detecting occupancy of the seat part 2. The first sensor can be designed in an analogue manner to the second sensor.

The at least one first detection device 5 and/or the at least one second detection device 6 can also comprise at least one first switching element 9, which can preferably be designed as a mechanical switching element. The occupant's body causes a weight force to act on the at least one first switching element 9, as a result of which the at least one first switching element 9 can be brought from a first switching state into a second switching state.

Figure 4:
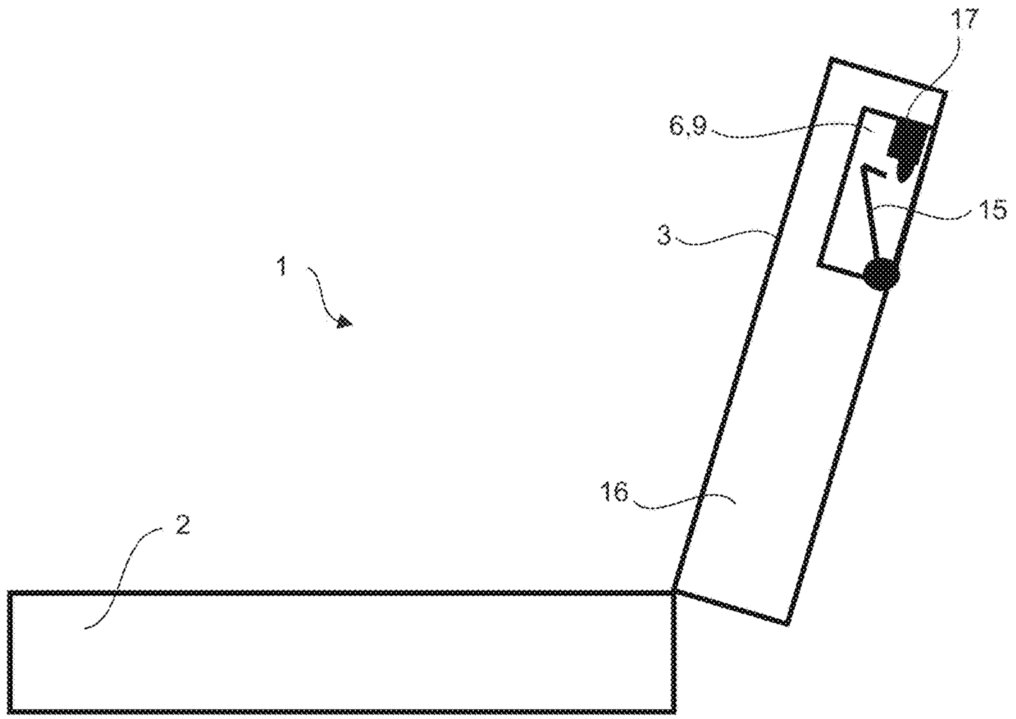
FIG. 4 a vehicle seat with an apparatus for detecting seat occupancy according to one embodiment.

A corresponding example is shown in FIG. 4. Here, a second detection device 6 is provided in the backrest 3, which comprises a mechanical switching element 9. The mechanical switching element 9 comprises a rocker element 15, which is pivotably arranged on a frame element of the backrest 3. Preferably, this rocker element 15 is arranged behind or in a cushion element 16 of the backrest 3. The cushion element 16 is deformed by the weight of the occupant, causing the rocker element 15 to pivot in such a way that it makes contact with a contact element 17. This contact closes the switching element 9 and outputs a corresponding signal, which is linked to a signal from the first detection device.

Figure 5:
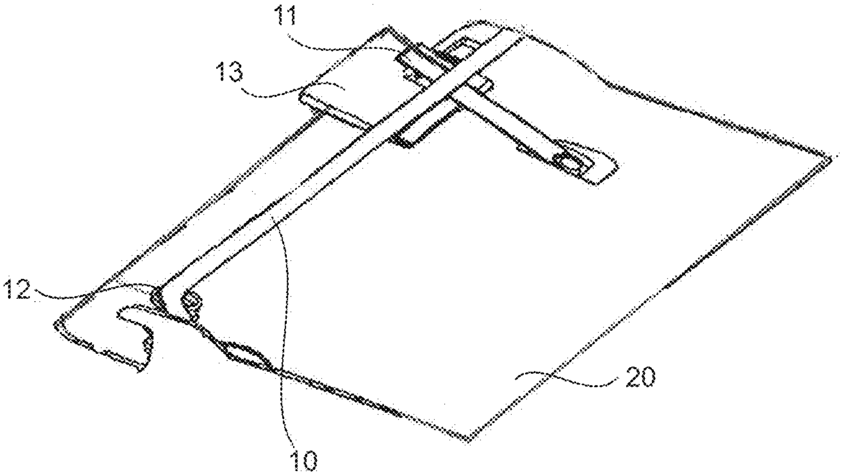
FIG. 5 a detection device according to one embodiment.
Figure 6:
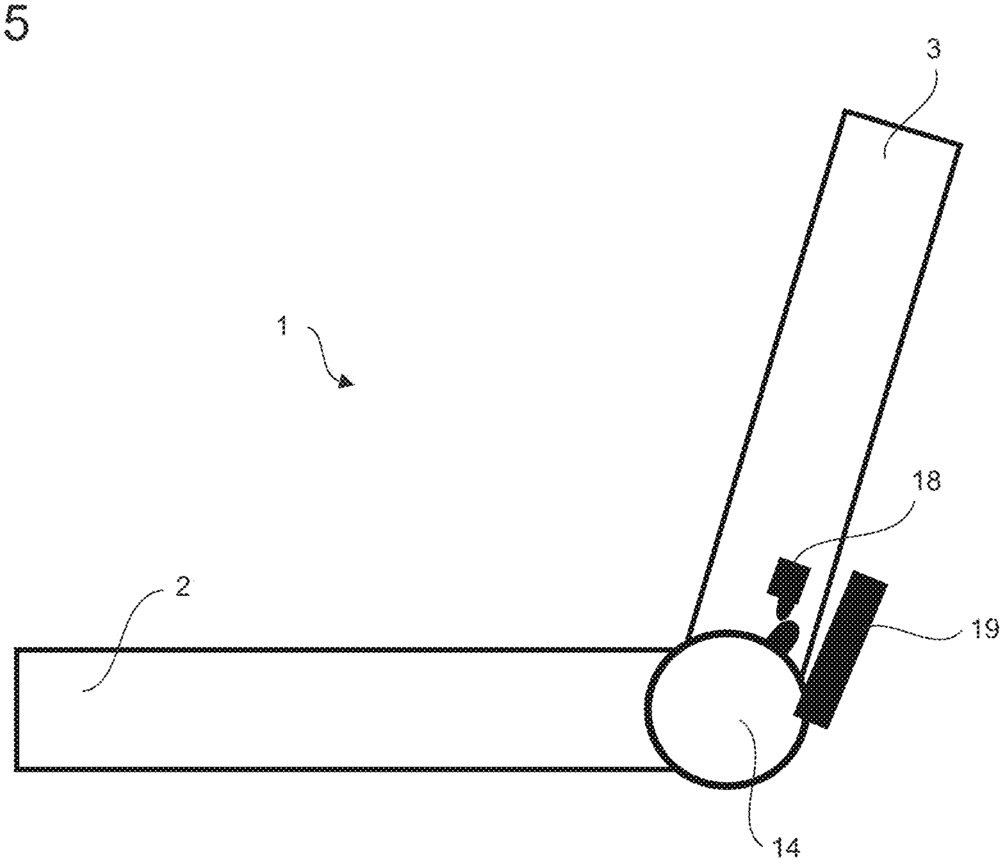
FIG. 6 a vehicle seat with an apparatus for detecting seat occupancy according to one embodiment.

A further embodiment of a first 5 and/or second detection device 6 is shown in FIG. 5. The respective detection device 5, 6 comprises a pivotably arranged rod-like element 10. This rod-like element 10 has a bracket-like design and is pivotably arranged on a substructure of the seat part 2 or the backrest 3. Furthermore, a prestressing element 12 is provided, which holds the rod-like element 10 in a first position. The rod-like element 10 is also in active contact with a second switching element 11. Furthermore, a plate-like element 20 is provided, on which the rod-like element 10, the prestressing element 12, the switching element 11 and a contact element 13 are arranged.

The rod-like element 10 is displaced downwards against the force of the prestressing element 12 as a result of a force being applied due to an occupancy. This displacement also causes the switching element 11 to be moved or displaced at the same time. Due to the displacement, the switching element 11 makes contact with a plate-like contact element 13. This contact outputs a corresponding signal, which is linked to the signal of the respective other detection device 5, 6.

In the case of the second detection device 6, the rod-like element 10 preferably extends over the entire or approximately the entire width of the backrest 3.

In the case of the first detection device 5, the rod-like element 10 preferably extends over the entire or approximately the entire width of the seat part 2. This ensures detection capability over the entire width of the seat part 2 or the backrest 3.

According to a further embodiment, the backrest 3 is arranged on the seat part 2 by means of two fittings 14. The backrest 3 can be tilted relative to the seat part 2. At least one fitting 14 comprises an elastic element, the elastic force of which counteracts the tilting. The fitting 14 may further comprise a positioning device and/or a locking device for a tilted position of the backrest 3 (not shown in the figures). The at least one second detection device 6 may be arranged in or on at least one fitting 14. An occupancy of the backrest 3 due to a pivoting thereof relative to the seat part 2 can thus be detected. The second detection device 6 can comprise a third switching element 18 and a third contact element 19. The third switching element 18 can be coupled to the elastic element of the fitting 14 and can be displaced or swivelled during a swivel, which is caused by the force applied by the body of the occupant, in such a way that it comes into contact with the third contact element 19. Such a contact outputs a corresponding signal, which is linked to the signal of the respective other detection device 5, 6.

Another way of realising a second detection device in a fitting 14 is to provide a measuring device for a torque that is generated by the displacement due to the occupancy. This measuring device emits a signal as soon as the torque exceeds a threshold value.

The applicant reserves the right to claim all features disclosed in the application documents as being essential to the invention, provided that they are new, either individually or in combination, compared to the prior art. It should also be noted that the individual figures also describe features which may be advantageous in themselves. The skilled person immediately recognises that a particular feature described in a figure can also be advantageous without the adoption of further features from this figure. Furthermore, the skilled person recognises that advantages can also result from a combination of several features shown in individual figures or in different figures.

LIST OF REFERENCE SYMBOLS

1 Vehicle seat
2 Seat part
3 Backrest
4 Apparatus for detecting seat occupancy
5 First detection device
6 Second detection device
7 Mat element
8 Second sensor
9 First switching element
10 Rod-like element
11 Second switching element
12 Prestressing element
13 Contact element
14 Fitting
15 Rocker element
16 Cushion element
17 Contact element
18 Third switching element
19 Third contact element
20 Plate-like element

What is claimed is:

1. A vehicle seat, for commercial vehicles, comprising a seat part and a backrest, wherein the vehicle seat has an apparatus for detecting seat occupancy, which comprises at least one first detection device and at least one second detection device, wherein the at least one first detection device is suitable and intended for detecting an occupancy of the seat part, wherein the at least one second detection device is suitable and intended for detecting an occupancy of the backrest wherein the apparatus for detecting seat occupancy outputs a seat occupancy state, wherein the seat occupancy state is only output as not occupied if the at least one first detection device and the at least one second detection device do not detect any occupancy, wherein the at least one first detection device outputs a first signal when occupied, wherein the at least one first detection device and the at least one second detection device are connected in parallel in terms of signaling technology or are linked by means of a logical OR operation, wherein by providing at least one second detection device for detecting occupancy of the backrest and by linking the output signals of the two detection devices accordingly, incorrect output of a non-occupancy of the seat when the occupant turns is thus avoided, and wherein output of the non-occupancy of the seat is operable to trigger disability of the vehicle either in part or in whole.

2. The vehicle seat according to claim 1, wherein the at least one first detection device is arranged in or on the seat part, wherein the at least one second detection device is arranged in or on the backrest.

3. The vehicle seat according to claim 1, wherein the at least one first detection device comprises at least one first sensor which is suitable and intended for detecting an occupancy of the seat part, wherein the first sensor is selected from the group of a mechanical sensor, a pressure sensor, a capacitive sensor, an inductive sensor, an optical sensor, an air-flow sensor, a temperature sensor, an ultrasonic distance sensor an electromagnetic sensor, wherein the at least one first sensor is arranged on a first mat element.

4. The vehicle seat according to claim 1, wherein the at least one second detection device comprises at least one second sensor which is suitable and intended to detect an occupancy of the backrest, wherein the second sensor is selected from the group: a mechanical sensor, a pressure sensor, a capacitive sensor, an inductive sensor, an optical sensor, an air-flow sensor, a temperature sensor, an ultrasonic distance sensor, an electromagnetic sensor, wherein the at least one second sensor is arranged on a second mat element.

5. The vehicle seat according to claim 1, wherein the at least one first detection device and/or the at least one second detection device comprises at least one first switching element, wherein a weight force acts on the at least one first switching element as a result of the occupancy, whereby the at least one first switching element can be brought from a first switching state into a second switching state.

6. The vehicle seat according to claim 1, wherein the at least one first detection device and/or the at least one second detection device comprises a pivotably arranged rod-like element, wherein a second switching element is provided, which is in active contact with the rod-like element, wherein a pre-stressing element is provided, which holds the rod-like element in a first position, wherein a force is exerted on the rod-like element by an occupancy, whereby the rod-like element is displaced to a second position, wherein the second switching element is also displaced by this displacement and thereby contacts a contact element.

7. The vehicle seat according to claim 1, wherein the backrest is arranged on the seat part by means of two fittings, wherein the backrest is pivotable relative to the seat part, wherein at least one fitting comprises an elastic element the elastic force of which counteracts the pivoting, wherein the at least one second detection device is arranged in at least one fitting, wherein an occupancy of the backrest can be detected due to a pivoting thereof relative to the seat part.

8. The vehicle comprising a vehicle seat according to claim 1.

* * * * *